United States Patent [19]
Kelley

[11] Patent Number: 5,300,955
[45] Date of Patent: Apr. 5, 1994

[54] METHODS OF AND APPARATUS FOR RECORDING IMAGES OCCURRING JUST PRIOR TO A RAPID, RANDOM EVENT

[75] Inventor: Edward F. Kelley, Montpelier, Id.

[73] Assignee: The United States of America as represented by the United States Department of Energy, Washington, D.C.

[21] Appl. No.: 802,589

[22] Filed: Dec. 5, 1991

Related U.S. Application Data

[63] Continuation-in-part of Ser. No. 373,536, Jun. 30, 1989, abandoned.

[51] Int. Cl.⁵ .............................................. H04N 1/21
[52] U.S. Cl. ................................. 346/107 R; 359/900
[58] Field of Search ................. 346/1.1, 107 R, 76 L, 346/108, 160; 358/296; 359/900

[56] References Cited

U.S. PATENT DOCUMENTS 3,729,249  4/1973  Habegger et al. ................... 359/900
3,774,986  11/1973  Bourgoin et al. ................... 359/900

*Primary Examiner*—Mark J. Reinhart
*Attorney, Agent, or Firm*—Virginia B. Caress; William R. Moser; Richard E. Constant

[57] ABSTRACT

An apparatus and a method are disclosed for recording images of events in a medium wherein the images that are recorded are of conditions existing just prior to and during the occurrence of an event that triggers recording of these images. The apparatus and method use an optical delay path that employs a spherical focusing mirror facing a circular array of flat return mirrors around a central flat mirror. The image is reflected in a symmetric pattern which balances astigmatism which is created by the spherical mirror. Delays on the order of hundreds of nanoseconds are possible.

12 Claims, 3 Drawing Sheets

METHODS OF AND APPARATUS FOR RECORDING IMAGES OCCURRING JUST PRIOR TO A RAPID, RANDOM EVENT

This is a continuation-in-part of application Ser. No. 07/373,536 filed on Jun. 30, 1989, now abandoned. This invention is owned by the U.S. Department of Energy.

FIELD OF THE INVENTION

The present invention relates generally to an optical delay path used to preserve the existence of an image in a light beam so that the recording of conditions just prior to a rapid, random event can be triggered by the event. More specifically, the invention is an array of $4n+2$ flat mirrors around a central flat mirror, opposite a spherical mirror, arranged to produce a focused image and a delay period of approximately one hundred nanoseconds or more.

BACKGROUND OF THE INVENTION

In studying the effectiveness of insulation in dielectrics or electrical phenomenon such as lightening, it is important to acquire information as to the phenomenon which occur just prior to the electrical discharge. Such information is of enormous value to industries such as the aircraft industry, which is currently utilizing and exploring further utilization of high-strength, light weight materials which are non-metallic. It is very unusual for lightening strikes on an airplane having a metallic skin to cause damage because the electrons are simply conducted from the part of impact over the metallic skin and back into the atmosphere from a discharge point. If the aircraft is made of a dielectric material, there is the distinct possibility that the aircraft will no longer be protected from lightening strikes, thus severely limiting or perhaps negating altogether further widespread use of dielectric materials as aircraft skins. There are, of course, many other reasons to study electrical breakdown phenomena or partial discharges through insulation so as to improve the design of electrical equipment generally. For example, in the electrical power industry, blown transformers cost utilities and their customers tens of millions of dollars per year. A better understanding of the behavior of the insulating liquids used in large electrical transformers could lead to improved transformer design, resulting in enormous savings to these utilities and their customers.

In electrical breakdown processes in general, it is the pre-breakdown events that are often of interest. These events may last only a few microseconds or less prior to the breakdown. In studying phenomenon such as electric breakdown, it is most helpful to have photographs of the event; however, due to the random nature of electrical discharges even within a very constricted time frame, it is sometimes very difficult to predict exactly when the discharge will occur. Consequently, the approach generally taken is to arrange for the photographic recording device to take pictures approximately when the breakdown is anticipated. After many pictures one may be able to capture the phenomena of interest. This is difficult if the phenomena are fast and the time between occurrences is long. Alternatively, it is possible to operate a trigger upon the occurrence of the discharge and to operate an image-converter camera or other highspeed photographic device with the trigger at the instant of discharge. The resulting photograph does not include what happened just prior to discharge, and thus a complete visual understanding of electrical discharge phenomenon is extremely difficult to precisely obtain. Since the time of a random discharge cannot be known precisely over time intervals which are long compared to the camera recording time, it is extremely difficult to plan for photographing the events which occur a few microseconds or less prior to dielectric breakdown. Accordingly, there is a need for a method of optically recording these prior phenomena and a need for an apparatus to practice the method.

Though there are inventions involving optical delay paths, none have the following features basic to the present invention: a spherical focusing mirror facing an array of flat mirrors arranged to preserve a well-focused image by repeatedly refocusing and correcting for asigmatism; recording triggered by a random event and recording only the images of interest; and recording images of conditions that occurred before recording was triggered.

U.S. Pat. No. 4,547,787, Kaneko, discloses an image-forming apparatus with displaying and printing functions. Unlike the present invention, images are continually recorded as a negative and printed as a positive. Thus, everything must be recorded. There is no optical delay path that uses only the repeated reflection and refocusing of a light beam to achieve an optical delay.

U.S. Pat. No. 3,025,406, Stewart et al., discloses a light screen for ballistic uses. Light is reflected back and forth between two screens, but the reflections are not intended to refocus an image and recording is not triggered by a random event.

U.S. Pat. No. 3,437,954, Herriott et al., discloses an optical delay line device with a pair of curved mirrors that form a resonator. A well-focused image is not produced, nor is recording triggered by a random event.

U.S. Pat. No. 3,571,738, Gloge, discloses a folded optical delay path. A well-focused image is not produced, nor is recording triggered by a random event.

U.S. Pat. No. 4,626,078, Chernin et al., discloses a multiple pass optical matrix system. A well-focused image is not produced, nor is recording triggered by a random event.

SUMMARY OF THE INVENTION

The invention is an apparatus for studying conditions in a medium by recording images of conditions existing just before rapid, random events in the medium, wherein the random event triggers recording of these images, comprising: a lighting means for generating a light beam and passing it through a medium being studied; a stimulating means for causing random events in said medium, wherein the random events generate an image that is carried by the light beam; a recording device for recording images carried by said light beam; a triggering means for activating said recording device upon the occurrence of said random events; and an optical delay path that receives the image carried by the light beam, preserves its existence, and presents a focused image to said recording device, wherein said optical delay path takes longer for the light beam to traverse than it takes for the triggering means to trigger said recording device so that the only images recorded are those generated during a fixed period before and during said triggering event. The optical delay path has an array of $4n+2$ flat mirrors (where n is an integer) in a symmetric circular array around a central flat mirror, all said flat mirrors facing a spherical focusing mirror. The distance between the flat mirrors and the spherical focusing mirror is the same as the focal length of the spherical focusing mirror.

Preferably, the flat mirrors and the spherical focusing mirror are high-reflectance dielectric mirrors. When operated in ambient air, there should be no more than 2% loss of light intensity with each reflection.

Astigmatic effects as would normally be present with a spherical mirror with off-axis reflections can be virtually eliminated by providing a symmetric path for the light beam such that each flat mirror in the circular array is used once in such a way that a symmetric pattern of reflections also occurs at the spherical focusing mirror. This is achieved by alternating long paths and short paths wherein the long path includes a reflection from the central flat mirror, two reflections from the spherical focusing mirror, and flat mirrors opposite each other in the array. The short path is from a mirror in the circular array to the spherical focusing mirror and then to another mirror in the circular array having a position counter-clockwise and one removed from the last mirror in the circular array that the image was reflected from, thus skipping a mirror. The skipping pattern can also be clockwise, so long as it is consistent.

The apparatus for practicing the invention comprises an image-converter camera, Kerr or Pockels shutter or the like which is triggered or operated by the random event under study. In the path between the camera and the site of the event is an optical delay device which, optically delays the transmission of the image so that conditions occurring tens or hundreds of nanoseconds prior to the triggering event can be recorded by the camera.

DETAILED DESCRIPTION OF THE PREFERRED EMBODIMENT

Figure 1:
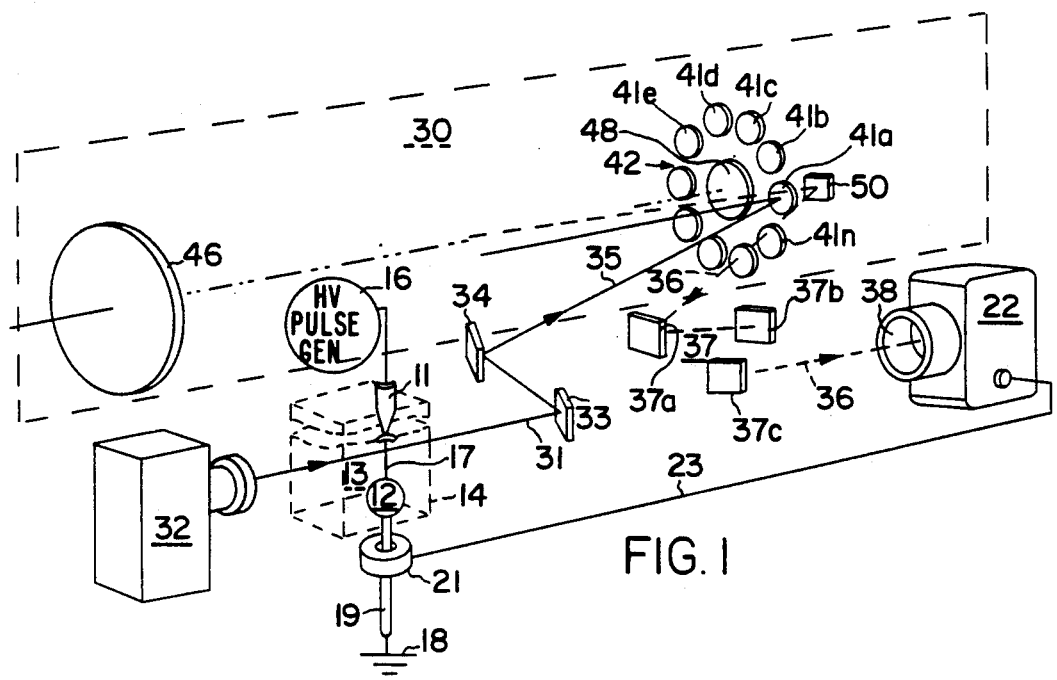
FIG. 1 is a perspective schematic view of the image-recording optical delay apparatus utilizing an image-converting camera.

Referring now to FIG. 1, there is shown a test site 10 which includes a pointed cathode 11 and a spherical anode 12. Disposed between the cathode 11 and the anode 12 is an insulating material 13 to be tested. In the illustrated embodiment, the material is a liquid insulator such as, for example, nitrobenzene contained in a liquid cell 14; however, the material being tested may be any material—solid, liquid, or gas, disposed between electrodes such as the cathode 11 and anode 12. The cathode 11 receives a high-voltage pulse of several microseconds in length from a standard high-voltage generating source 16 which causes an electrical discharge 17 that jumps between the cathode 11 and anode 12 and is conducted to ground 18 through a conductor 19.

The discharge 17 is the event under study; however, since it is a random event, it is only possible to predict the time to breakdown of the insulting liquid to within a few microseconds. Thus, if all conditions were to be recorded, at best only a few percent of the images obtained would be of interest. Accordingly, the breakdown in the liquid cell 14 is monitored by a current-pulse transformer 21 which detects the high-current pulse in the conductor 19 and, upon detection, triggers within 50 ns (or longer) operation of the image-converter camera 22 via a signal over line 23. The invention was reduced to practice using an Imacon 790 image-converter camera manufactured by Hadland Photonics, Ltd. in Great Britain. The time required to trigger recording was between 100 and 150 ns. After triggering, the camera could record an image every 50 ns. Triggering times on the order of 50 ns could be achieved with other recording equipment that was commercially available at the time the invention was made, such as a high speed gating generator (AVR series, available from AVTECH in Ottowa, Canada) in combination with a gated intensified CID or CCD camera (F4561 or F4562, available from ITT, Electrooptical Products Division, Fort Wayne Ind.). In that the image-converter camera 22 relies on a signal from the current-pulse transformer 21 and responds within 50 ns (or longer) after the occurrence of the signal, the camera can photograph the discharge 17 after the discharge has taken place.

In studying the phenomena which occur just prior to breakdown, it is necessary to photograph events having a duration of as little as 100-200 ns. In the instant before discharge, it is reasonable to assume that the pre-breakdown structure of the insulator or dielectric becomes a good conductor. Knowing what the material looks like and how it is configured when it makes the transformation from an insulator to a good conductor is of great scientific and practical interest and is one of the ends to which the instant invention is directed.

In order to preserve the existence of the image of pre-event phenomena, the instant invention utilized an image-preserving optical delay path, designated generally by the numeral 30, to present the camera 22 with an image of prior phenomena. Without the optical delay, the camera 22 could only record images after 50 ns (or however long it takes to trigger recording). Recording is caused by impingement on film within the camera of a light beam 31 generated by a xenon flash tube 32 which passes through the area of the liquid cell 14 in which the breakdown occurs. In accordance with the instant invention, the light beam 31 is reflected by a flat mirror 33 to an entrance mirror 34 which directs the beam 31 into the image-preserving optical delay 30 where it becomes delayed beam 35. The light containing the image carried by the beam 35 emerges from the optical delay 30 as an exit beam 36 which is reflected by at least one directional mirror 37 in an exit mirror system into the entrance 38 of the image converter camera 22. In the illustrated embodiment, the exit mirror system includes three mirrors, 37a, 37b, and 37c for reflecting the exit beam 36 into the entrance 38 of the camera. A lens can be configured at the entrance 38 of the camera to change image magnification.

The purpose of the image-preserving optical delay 30 is, of course, to store the image conveyed by the light beam 31 until after the image-converter camera 22 is triggered to allow illumination of the film therein and to then direct the image into the entrance 38 of the camera via exit beam 36. Since the phenomena to be observed often occur can over a time span of 100-500 ns and the operation of the camera occurs within 50 to 150 ns after the event, preserving the existence of the phenomena image in optical delay 30 for more than 150 ns is sufficient to present the camera with an image of time past. Storage of the image in the beam 31 is accomplished by reflecting the beam initially onto a first flat, circular reflection mirror 41a of a return mirror array, designated generally by the numeral 42, which comprises a series of flat, circular reflecting mirrors 41a-41n disposed about a central reflecting mirror 48. Upon being reflected by flat mirror 41a, the beam 31 impinges upon a concave spherical focusing mirror 46 which is coaxial with the central reflecting mirror 48 positioned at the center of the circular return mirror array 42 at the position of the focal point of the spherical mirror. The spherical mirror then directs the reflected image to the next flat mirror 41b in the array 42 which, in turn, reflects the image back to the concave mirror. The reflection is indexed from one mirror to another in the array 41a-41n until it is finally reflected back by the last mirror 41n in the array, whereupon the final image is reflected to an exit mirror 50. The exit mirror 50 directs the exit beam 36 out of the optical delay to a series of flat mirrors 37 that direct the beam into the camera. In order to have a focused image, according to the principles illustrated in FIGS. 3, 4, and 5, the distance between the exit mirror and the site of image recording is the same as the distance between the spherical mirror and the flat mirrors. It can be seen in FIGS. 1 and 7 that the mirror at which the beam enters the array borders the mirror at which it exits. By position the entry mirror precisely within the circular array, and the exit mirror is as close as possible to the entry mirror, a virtually symmetric pattern is provided that is able to minimize astigmatism.

STRUCTURE OF THE IMAGE-PRESERVING OPTICAL DELAY

Figure 4A:
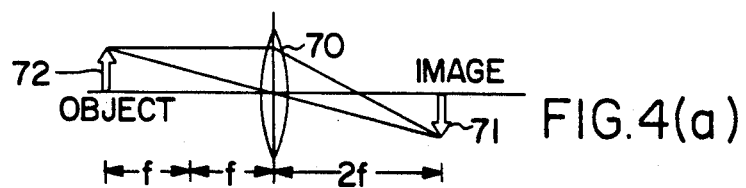
FIGS. 4a and 4b are lens equivalent schematic of the image-preserving optical delay.
Figure 4B:
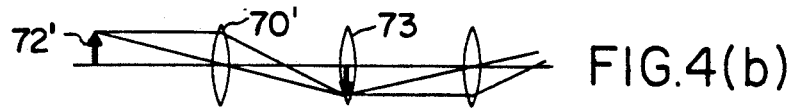

A conceptual description of the optical delay is given in FIG. 4. A lens, item 70, produces an inverted image 71 of an object 72 with unit magnification if the object is place a distance $2f$ from the lens, where f is the focal length of the lens, see FIG. 4(a). If an identical lens, 73, is placed at the image position of the first lens 70' in FIG. 4b, the second lens will serve as a field lens. By repeating this two-lens arrangement, i.e., by placing multiple lens pairs in series, a long path of lenses is created which continually refocuses the image. The longer the path the longer the time required for the light to pass through and thus the longer the delay. The use of mirrors allow the folding of the light path, which permits the device to be shorter, which requires only one focusing element (the concave spherical focusing mirror), and which allows the circuit for triggering the camera to have a path considerably shorter than the optical delay.

Figure 5:
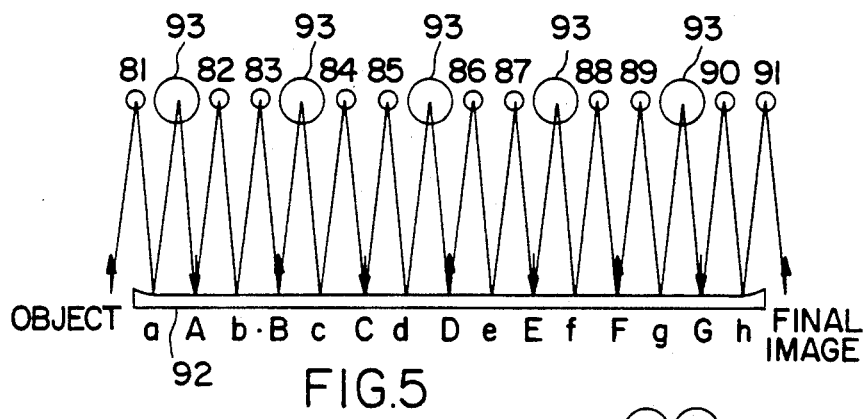
FIG. 5 illustrates the path followed by light inside the image-preserving optical delay system.

As an aid to explaining the light path of the optical delay, the mirror arrangement and light diagram of FIG. 5 is included. The small, flat mirrors in the circular array 81-91 are numbered according to the sequence in which they are employed. The regions on the spherical focusing mirror 92 that are hit by the beam are alphabetically labeled according to their sequence with the real images denoted by capital letters and the intermediate beam reflections denoted by lower case letters. The central array mirror is represented by the circles numbered 93. There is of course only one central mirror.

Figures 6A, 6B:
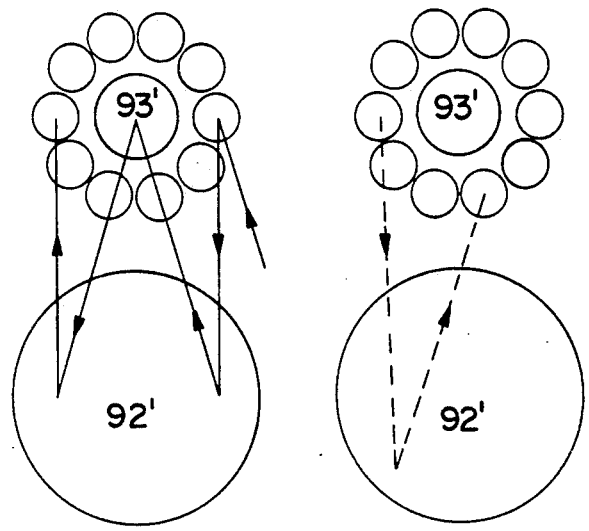
FIGS. 6a and 6b illustrate the reflection sequences between the flat mirror array and the spherical mirror as viewed from the position of the spherical mirror, with the long path shown if FIG. 6a and the short path shown in FIG. 6b.
Figure 7:
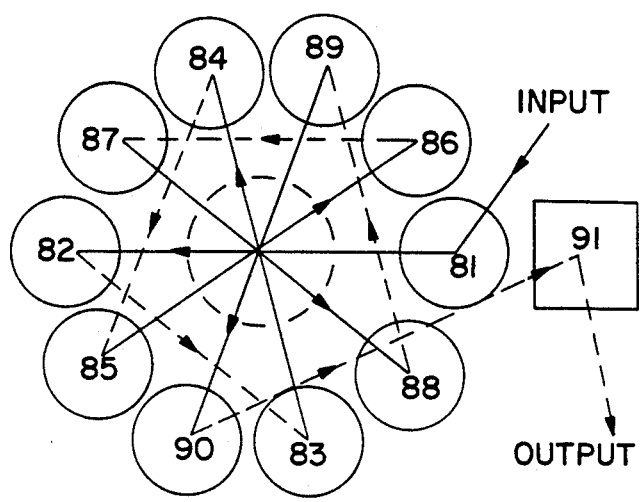
FIG. 7 shows the total combination of long (solid lines) and short (dashed lines) paths as viewed from the spherical mirror.

It is helpful to distinguish two types of reflected light paths—a long path and a short path, as shown in FIG. 6. The long path (FIG. 6a) traverses the flat mirror array across its diameter with two reflections off the spherical focusing mirror and one reflection off of the central flat mirror. The short path (FIG. 6b) only has one reflection off the spherical focusing mirror and avoids the central mirror. FIG. 7 shows the complete reflection sequence across the flat mirror array as viewed from the spherical mirror. The numbers on the mirrors correspond to the numbers in FIG. 5. The solid lines represent the long path and the dashed lines represent the short path. It is important to note that the short path always skips a mirror, i.e., after mirror 82 the short path must "skip" adjoining mirror 88 and hit the next mirror 83.

Figure 8:
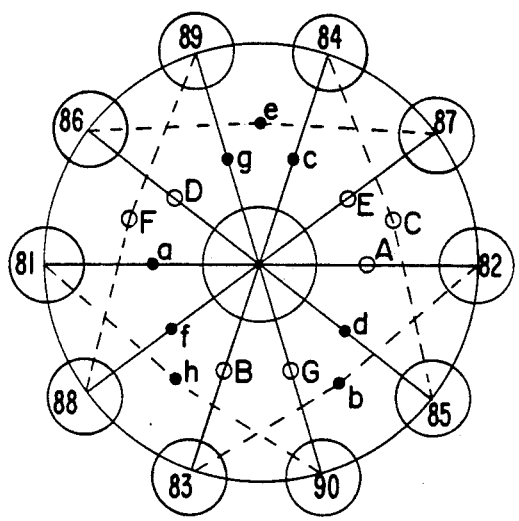
FIG. 8 shows a beam reflection pattern on the spherical mirror as viewed from behind the flat mirror array.
Figure 9:
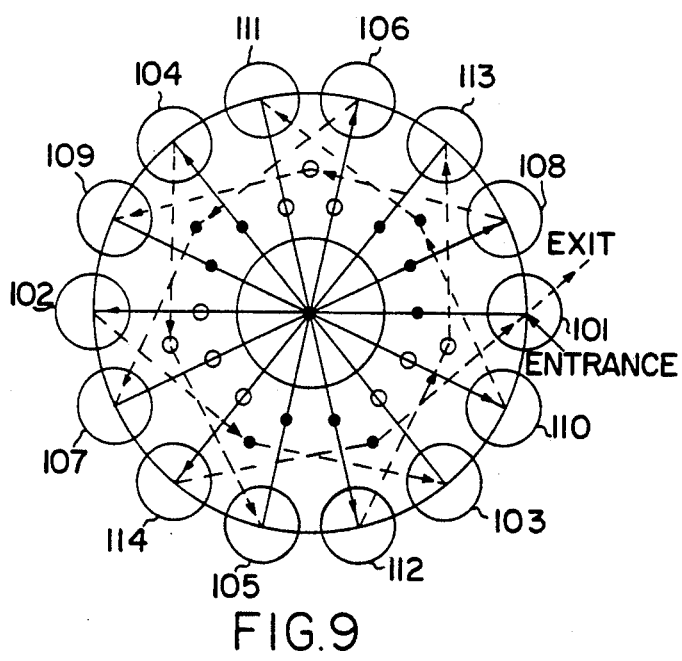
FIG. 9 shows a beam reflection pattern on the spherical mirror as viewed from behind a flat mirror array which uses 14 circumferentially arranged mirrors.

A skipping pattern that has this short path alternating with a long path provides a sequence that will hit every mirror in the array once. As can be seen in FIGS. 7, 8, and 9, this skipping pattern uses the spherical mirror symmetrically. Off-axis imaging from a focusing mirror is what introduces astigmatism, and using the entire surface of the spherical mirror in a symmetrical pattern balances astigmatism. In order for a symmetric pattern to be achieved, the number of flat mirror in the circular array must be $4n+2$, where n is an integer.

Various kinds of mirrors can be used, but highreflectance dielectric mirrors are desirable to reduce light losses. With 10 flat mirrors, there are 30 reflections, not counting the mirrors used to direct the beam into the array and to the camera. With six mirrors to perform these functions, there are 36 reflections. If each mirror had a reflectivity of 99%, then the amount of light reaching the camera would be 70%. Clearly, any dirt on the mirror surfaces will cause losses. So will scratches and pits. If the reflectivity were reduced to 98% due to dirt and imperfections, then the amount of light reaching the camera would be 48%. Similarly, using mirrors of 95% reflectivity would result in only 16% of the light getting through the optical delay system; 90% reflectance gives only 2.3% of the light. The attenuation A in terms of the reflectance R and the number of reflections N is given by $A = R^N$.

An example of an optical delay using mirrors is as follows. An array of ten, 2.5 cm diameter, flat mirrors, items 41, FIG. 1, are symmetrically arranged about a central, 5 cm diameter, flat mirror 48, which is placed on the optical axis at the focal point of a spherical mirror 46 having a diameter of 15 cm and a focal length of 152 cm. The image of an object travels a distance $2f$ to the spherical mirror and is refocused through the system by aligning the mirrors appropriately. The image is formed a distance of $2f$ from the spherical mirror with a total magnification of unity.

The total beam path length from object to the image is 32 focal lengths. The path of the beam is depicted in FIG. 5, where the large circles 93 represent one flat central mirror and the small circles 81–90 represent the array of ten mirrors and 91 represents the exit mirrors. As can be seen in FIG. 5, the number of beams shown in the depiction of the path is 32. The mirrors are spaced so that the path between the spherical mirror and any mirror in the array is equal to one focal length. Half of the mirrors are involved in a long path ($4f$) and half in a short path ($2f$). In other words, each pair of mirrors is involved in one long path and one short path ($4f+2f=6f$). The number of pairs of mirrors is $2n+1$. Thus, the path length within the array is $6f(2n+1)$. The path length from the image to the entry point of the array is one focal length, as is the path length from the exit mirror to the camera. Thus, the total path length is $f[6(2n+1)+2]$. When n is 2, the total path length is $32f$. Multiplying 32 by the focal length 152 cm and dividing the product by the speed of light in air ($3 \times 10$ s m/sec, the same as its speed in a vacuum within three significant figures) yields a 162 ns delay. If a high-speed photographic recording device takes pictures within 50 ns after the triggering event, then 110 ns of pre-trigger phenomena could be recorded. This system provides a resolution of 10 line pairs per millimeter (10 lp/mm). The optical delay 30' configured in accordance with these dimensions has less than two meters in length and less than 0.2 meters in width, and thus can be conveniently mounted on a laboratory table.

It is straightforward to develop optical delays with longer delays than 162 ns. For instance, using a 372 cm focal length mirror with a 30 cm diameter, a larger array could be used which employs 14 mirrors (n=3), items 101 to 114, FIG. 9, of 5 cm diameter arranged in a circles around a 7.5 cm central mirror. Using this arrangement, the total path length is 164 m (3.72 m$[6(2*3+1)+2]$) providing a delay from object to image of 546 ns. Again, the symmetrical rotation of the beam path around the optical axis, using a combination of long and short paths is needed to minimize astigmatism. (Compare with FIG. 6.)

It is possible to make an optical delay path with an array having 6, 10, 14, 18, 22, . . . $4n+2$ mirrors in the circle around the central flat mirror. In order to use more of the surface of the spherical mirror, it is possible to employ two concentric circular arrays around the central flat mirror. However, since such a system cannot be perfectly symmetric in its use of the spherical mirror, a small amount of astigmatism is added by using a second circular array.

Figure 2:
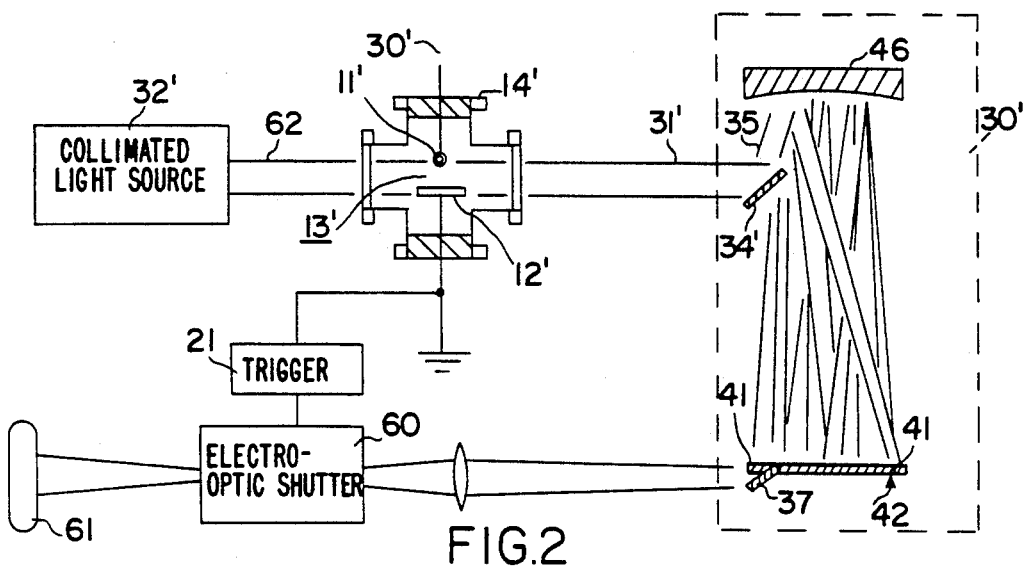
FIG. 2 is a diagrammatical view of a second embodiment of the instant invention employing a Kerr or Pockels shutter or any fast imaging system for exposing film directly.

Referring now to FIG. 2 where a second embodiment of the invention is shown, like reference numerals represent similar structure. In FIG. 2, an electro-optic shutter 60 (for instance a Kerr shutter or a Pockels shutter) is used to produce a single-shot, full-frame, high-resolution photograph on recording means (e.g., film) 61 of an image 31' which is produced by passing a beam 62 of light from a light source such as a continuous-wave laser 32' through the test cell 14'. By utilizing the electro-optic shutter 60, an image of higher spatial resolution may be recorded on the film 61 than is obtainable with an image-converter camera. The configuration in FIG. 2 is also necessary if an image-converter camera is employed with the use of a continuous light source. The electro-optical shutter serves to prevent the bright light from fogging the film in the camera during the periods when the system awaits a triggering event.

One of the major advantages of the system of FIG. 1 and 2 is that it is rugged enough to be used in a variety of settings. Situated on a table-top, the device contains optical components which require alignment. However, normal vibration, air currents, and airborne dust have minimal effect on the system's operation. Also, the system does not require a clean room, an optical bench, or any other special features. The spherical mirror needs a two-axis adjustment which can be provided by a device such as a gimbal mount. The array mirrors similarly need only adjustment in two axes perpendicular to the axis of the spherical mirror. Alignment is easiest if the circumferential-array-mirror adjustment axes are tangential and radial to the central mirror.

Figure 3:
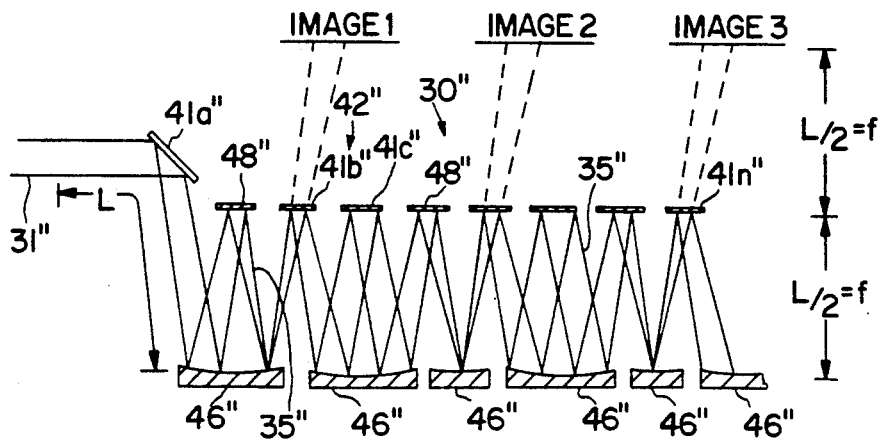
FIG. 3 is a diagrammatical view of a system graphically demonstrating the operation of the optical time delay of the instant invention.

The principal upon which the image delays 30 and 30' are based is illustrated in more detail in FIG. 3 wherein the focusing mirror 46 (see FIG. 1) is shown for purposes of illustration as a line of separate focusing mirrors 46" with the array of flat return mirrors 41a"–41n" and central mirror 48" arranged in a line facing the focusing mirror. The insertion mirror 41a" reflects the beam 31" containing the image of phenomena occurring before the discharge 17 (followed by an image of the discharge itself) into the image delay 30" where the internal beam 35" containing the image information is reflected from the first focusing mirror 46" to the central reflecting mirror 48" and back to the focusing mirror which again reflects the image to the reflecting mirror. This occurs a plurality of times (3 in the illustration) as the beam moves across the single focusing mirror 46" and the image is then focused on the spherical mirror 46" by the mirror 41b" in the in-line array of reflecting mirrors 42". The line of reflecting mirrors 41a"–41n" and central mirror 48" are spaced from the focusing mirrors 46" by a distance equal to the focal length ($L/2=f$) of the focusing mirrors 46" so that the beam 35" reflected back to the focusing mirrors 46" by the reflecting mirrors is in focus upon arrival at the focusing mirror. Once the internal beam 35" containing the image is trapped within the optical delay 30", it is indexed through the delay without interfering with itself. In order to refocus the image, the flat mirrors 42" are alternated with the focusing mirrors 46". From FIG. 3, it is readily apparent that the internal beam 35" in the optical delay 30" travels a distance the length of which is determined by the space between the mirrors ($L/2=f$) and the number of reflections within the delay apparatus. Upon deciding what the duration of the delay should be in nanoseconds and selecting an appropriate focal length for the focusing mirrors 46", the number of mirrors necessary to achieve the desired delay is readily determined. The principle embodied in the linear array of mirrors shown in FIG. 3 is readily converted to the circular array shown in FIGS. 1 and 2 where a single focusing mirror 46 and single central reflecting mirror 48 are utilized.

The development of a larger system with a longer delay might allow the whole process to be acoustically triggered. Such an arrangement could, for example, allow researchers to record the failure mode of an engine when the engine is intentionally stressed to failure.

Although the present invention has been described with respect to exemplary embodiments thereof, it will be understood by those of ordinary skill in the art that variations and modifications can be effected within the scope and spirit of this invention.

What is claimed is:

1. An apparatus for recording images of events in a medium, wherein the images that are recorded are of conditions existing just prior to and during the occurrence of a triggering event in the medium and wherein the triggering event triggers recording of these images, comprising:
- a lighting means for continuously generating a light beam and passing it through a medium being studied;
- a stimulating means for causing random events in said medium, said random events generating an image that is carried by said light beam;
- a recording means for recording images carried by said light beam;
- a triggering means for enabling said triggering events caused by said stimulating means to activate said recording means upon the occurrence of said random events; and
- an optical delay path that receives the imagebearing light beam and presents a focused image to said recording means, wherein:
  - said optical delay path takes longer for the light beam to traverse than it takes for the triggering means to trigger said recording means so that the images recorded are those generated during a fixed period before and during said triggering event,
  - the optical delay path has an array of $4n+2$ flat mirrors (where n is an integer) in a symmetric circular array around a central flat mirror, all said flat mirrors facing said spherical focusing mirror and are at a distance equal to the focal length of said spherical mirror,
  - astigmatic effects caused by off-axis reflections from said spherical focusing mirror are minimized by a reflection sequence that provides a symmetric path in which each flat mirror in the symmetric circular array is hit once,
  - from which said light beam passes to said recording means.

2. The apparatus of claim 1 in which the symmetric path is achieved by alternating long paths and short paths wherein:
- each long path has one reflection from the central flat mirror preceded and followed by reflections from the spherical focusing mirror and wherein the reflections preceding and following the reflections from the spherical focusing mirror are from two mirrors opposite each other in the circular array of flat mirrors and
- each short path is from a mirror in the circular array to the spherical focusing mirror and then to another mirror in the circular array having a position clockwise and skipping a mirror from the last mirror in the circular array that the image was reflected from,
- wherein the first reflection is in a long path and long paths and short paths alternate until each mirror in the circular array has been hit once, whereupon the light beam is directed to an exit.

3. The apparatus of claim 1 in which the symmetric path is achieved by alternating long paths and short paths wherein:
- each long path has one reflection from the central flat mirror preceded and followed by reflections from the spherical focusing mirror and wherein the reflections preceding and following the reflections from the spherical focusing mirror are from two mirrors opposite each other in the circular array of flat mirrors and
- each short path is from a mirror in the circular array to the spherical focusing mirror and then to another mirror in the circular array having a position counter-clockwise and skipping a mirror from the last mirror in the circular array that the image was reflected from,
- wherein the first reflection is in a long path and long paths and short paths alternate until each mirror in the circular array has been hit once, whereupon the light beam is directed to an exit.

4. The apparatus of claim 2 wherein the exit is an exit mirror bordering the first mirror of the first long path, aligned with other flat mirrors such that the light beam is directed to said recording means positioned at the same distance from the circular array as the circular array is from the spherical focusing mirror.

5. The apparatus of claim 3 wherein the exit is an exit mirror bordering the first mirror of the first long path, aligned with other flat mirrors such that the light beam is directed to said recording means positioned at the same distance from the circular array as the circular array is from the spherical focusing mirror.

6. The apparatus of claim 1 wherein the recording means includes an electro-optical shutter and photographic film.

7. The apparatus of claim 1 wherein the recording means includes an image-converter camera and photographic film.

8. The apparatus of claim 1 wherein the event under study is an electrical discharge and the pheonomena occurring just prior to said triggering event includes conversion of a dielectric to a conductor.

9. The apparatus of claim 1 wherein the number of flat mirrors in the circular array is at least ten, the focal length of the spherical mirror is at least 150 cm, the recording means can be triggered in less than 150 ns, and the conditions of interest occur at least 150 ns before the triggering event.

10. The method for recording images of events in a medium, wherein the images that are recorded are of conditions existing just prior to and during the occurrence of a triggering event in the medium and wherein the triggering event triggers recording of these images, comprising:
- continuously generating a light beam and passing it through a medium being studied;
- stimulating the medium, thereby causing random events in said medium, said random events generating an image that is carried by said light beam;
- recording images carried by said light beam;
- using events caused by said stimulating means to trigger said recording means upon the occurrence of said random events; and
- directing the image into an optical delay path that receives the image-bearing light beam and presents a focused image to said recording means, wherein:
  - said optical delay path takes longer for the light beam to traverse than it takes for the triggering means to trigger said recording means so that the only images recorded are those generated during a fixed period before and during said triggering event,
  - the optical delay path has an array of $4n+2$ flat mirrors (where n is an integer) in a symmetric circular array around a central flat mirror, all said flat mirrors facing said spherical focusing mirror and are at a distance equal to the focal length of said spherical mirror,
  - astigmatic effects caused by off-axis reflections from said spherical focusing mirror are minimized by a reflection sequence that provides a symmetric path in which each flat mirror in the symmetric circular array is hit once, recording the image carried in said light beam.

11. The method of claim 10 in which the symmetric path is achieved by aligning the mirrors wherein:

the light beam is directed to a mirror in the circular array of flat mirrors;

the mirror in the circular array directs the light beam to the spherical focusing mirror at an angle such that the light beam is reflected to the central flat mirror, which reflects the image back to the spherical focusing mirror, which reflects the image to a mirror in the circular array which is in a position opposite the previously hit mirror in the circular array, thereby completing a long path;

upon completion of a long path, the beam is directed to a spherical focusing mirror at an angle such that the next mirror hit is a flat mirror in the circular array having a position clockwise and skipping a mirror from the second last mirror in the circular array that the image was reflected from, thereby completing a short path;

wherein the flat mirrors in the circular array are aligned so that long paths and short paths alternate until each mirror in the circular array has been used once, whereupon the light beam is directed to an exit mirror.

12. The method of claim 10 in which the symmetric path is achieved by aligning the mirrors wherein:

the light beam is directed to a mirror in the circular array of flat mirrors;

the mirror in the circular array directs the light beam to the spherical focusing mirror at an angle such that the light beam is reflected to the central flat mirror, which reflects the image back to the spherical focusing mirror, which reflects the image to a mirror in the circular array which is in a position opposite the previously hit mirror in the circular array, thereby completing a long path;

upon completion of a long path, the beam is directed to a spherical focusing mirror at an angle such that the next mirror hit is a flat mirror in the circular array having a position clockwise and skipping a mirror from the second last mirror in the circular array that the image was reflected from, thereby completing a short path;

wherein the flat mirrors in the circular array are aligned so that long paths and short paths alternate until each mirror in the circular array has been hit once, whereupon the light beam is directed to an exit mirror.

* * * * *